United States Patent
Bohn et al.

(10) Patent No.: US 6,773,027 B2
(45) Date of Patent: Aug. 10, 2004

(54) GAS BAG

(75) Inventors: Stefan Bohn, Goldbach (DE); Joachim Fellhauer, Nilkheim (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/457,750

(22) Filed: Jun. 9, 2003

(65) Prior Publication Data

US 2003/0234528 A1 Dec. 25, 2003

(30) Foreign Application Priority Data

Jun. 21, 2002 (DE) .......................................... 202 09 659

(51) Int. Cl.[7] .............................................. B60R 21/24
(52) U.S. Cl. ..................... 280/729; 280/739; 280/743.1
(58) Field of Search ................................ 280/729, 739, 280/743.1

(56) References Cited

U.S. PATENT DOCUMENTS

| | | | | |
|---|---|---|---|---|
| 5,496,063 A | * | 3/1996 | Conlee et al. | 280/739 |
| 5,529,337 A | * | 6/1996 | Takeda et al. | 280/729 |
| 5,725,244 A | * | 3/1998 | Cundill | 280/739 |
| 6,056,318 A | * | 5/2000 | Braunschadel | 280/739 |
| 6,095,557 A | * | 8/2000 | Takimoto et al. | 280/739 |
| 6,588,798 B2 | * | 7/2003 | Bohn et al. | 280/743.1 |

FOREIGN PATENT DOCUMENTS

| | | | |
|---|---|---|---|
| EP | 0700809 | | 3/1996 |
| EP | 1 022 198 A1 | * | 1/1999 |
| JP | 6-286568 | * | 10/1994 |
| JP | 06286570 | | 10/1994 |
| JP | 6-286570 | * | 10/1994 |
| JP | 7-329695 | * | 12/1995 |
| JP | 8-268213 | * | 10/1996 |
| JP | 11105664 | | 4/1999 |
| WO | WO 03/006276 | | 1/2003 |

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

A gas bag for a vehicle occupant restraint system has a covering forming a main chamber of the gas bag, with a passage opening, and an inner bag with an inflow opening and at least one ventilation opening. An edge of the inflow opening of the inner bag is connected with an edge of the passage opening and the gas bag has in a region of the connection of covering and inner bag a constriction for the inner bag. In a folded state of the gas bag, the inner bag is turned in into an interior of the covering and is able to emerge from the covering through the passage opening during an inflation of the gas bag.

7 Claims, 1 Drawing Sheet

GAS BAG

FIELD OF THE INVENTION

The invention relates to a gas bag for a vehicle occupant restraint system.

BACKGROUND OF THE INVENTION

Many of the gas bags currently in use are provided with ventilation openings which in certain situations are freed in order to allow a controlled outflow of the gas from the interior of the gas bag. There are various solutions for the freeing of such ventilation openings.

In EP-A-0 700 809 a gas bag is described in which the section of the gas bag which has the ventilation openings is turned in into the remainder of the gas bag in the folded state of the gas bag, the turn-in being closed by a tear seam. Hereby, it is ensured that the section of the gas bag having the ventilation openings can only unfold from the gas bag when a certain internal pressure is exceeded, by which a sufficiently high force is applied in order to destroy the tear seam. However, it is costly in terms of manufacturing technology to provide a tear seam with a precisely defined opening force.

BRIEF SUMMARY OF THE INVENTION

It is an object of the invention to provide a gas bag in which it is possible in a simple manner to predetermine the force required for the freeing of the ventilation opening.

This is achieved in a gas bag for a vehicle occupant restraint system having a covering limiting an interior defining a main chamber of the gas bag and having a passage opening, and an inner bag with an inflow opening and at least one ventilation opening. An edge of the inflow opening of the inner bag is connected with an edge of the passage opening. The gas bag has a constriction for the inner bag in a region of the connection of said edges, i.e. at the transition between the covering and the inner bag. In a folded state of the gas bag, the inner bag is turned in into an interior and is able to emerge from the covering through the passage opening during an inflation of the gas bag. The force required to free the inner bag and hence the ventilation opening depends on the size, e.g. the cross-sectional area, of the passage opening and on the volume of the gas bag material for the inner bag. These are parameters which are relatively simple to determine and easy to reproduce exactly. In the gas bag according to the invention, a tear seam can be dispensed with entirely.

Preferably, the ventilation opening is arranged so that during the inflation, before the emergence of the inner bag from the covering, substantially no gas emerges through the ventilation opening, so that the ventilation opening is effectively closed by the fabric layers lying adjacent to each other.

Advantageously, the internal pressure at which the inner bag emerges from the covering can be predetermined by the selection of the diameter or of the cross-sectional area of the passage- or inflow opening, i.e. the constriction, and can be adapted to the respective purpose of use of the gas bag.

The volume of the inner bag can be distinctly smaller than the volume limited by the covering in the inflated state, because the inner bag serves principally to free the ventilation opening following a certain internal pressure of the gas bag.

The covering and the inner bag can be woven in one piece in a known manner. In this case, the operating step of sewing together the inner bag and the covering can be eliminated. Of course, it is also possible to sew the inner bag together for example from two fabric layers, one provided here with the inflow opening.

Preferably, with the inner bag having emerged, the ventilation opening faces an outer face of the covering, and preferably in a state installed on the vehicle, the emerged inner bag is arranged on a side facing away from an occupant, so that hot gas is prevented from flowing in the direction of the occupant.

Of course, it is also possible to provide an inner bag with several ventilation openings.

DETAILED DESCRIPTION OF THE PREFERRED EMBODIMENT

Figure 1:
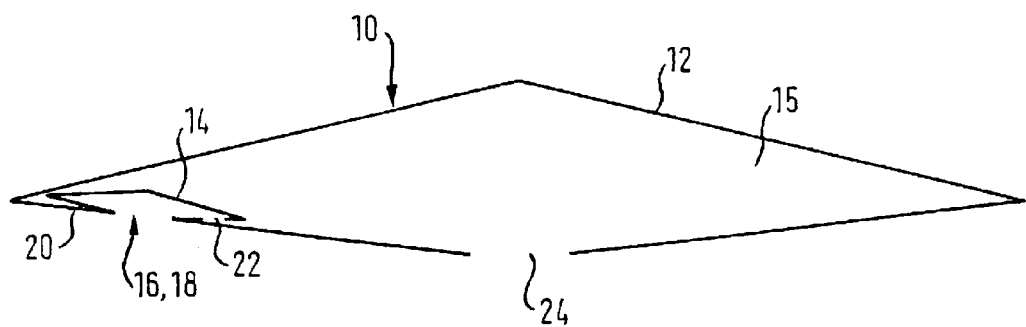
FIG. 1 shows a diagrammatic section through a gas bag according to the invention, in a non-inflated state.

FIG. 1 shows a gas bag 10 with a fabric covering 12, limiting its interior, i.e. a main chamber 15 of the gas bag 10 and representing a protective cushion which is intended to catch a vehicle occupant 13 in the case of an accident.

The gas bag 10 has an inner bag 14, also made from a fabric, which is provided with a ventilation opening 22. The volume of the inner bag 14 is distinctly smaller than that of the main chamber 15 limited by the covering 12. The inner bag 14 is connected with the covering 12 such that an inflow opening 16 of the inner bag 14 is connected with a passage opening 18 arranged in the covering 12, and a constriction 20 is formed between the main chamber 15 and the inner bag 14. The edges defining the passage and the inner openings 18 and 16, respectively, are connected with each other at the constriction 20.

In the folded state of the gas bag 10, the inner bag is turned in through the passage opening 18 into the interior of the covering 12 and is folded together jointly therewith.

When the gas bag 10 is filled via an inflation opening 24 with gas from a source of compressed gas, which is not shown, the inner bag 14 is pressed out from the covering 12 through the passage opening 18, as soon as a predetermined internal pressure in the gas bag 10 is reached. As soon as the inner bag 14 has emerged from the covering 12, gas can flow out into the open air through the ventilation opening 22.

By means of the cross-sectional area of the constriction 20, the resistance the inner bag 14 has to overcome to emerge from the covering 12 can be set exactly. From this, the internal pressure results at which the ventilation opening 22 is freed. The precise size of the passage opening 18 is dependent on the respective purpose of use of the gas bag 10 and can be determined and established in a simple manner by a person skilled in the art.

As shown in FIG. 1, the ventilation opening 22 is arranged such (namely close to the constriction 20) that no gas can flow out from the covering 12 as long as the inner bag 14 has not emerged from the covering 12. The ventilation opening 22 is closed by the covering 12 in the partly inflated state of the gas bag as the inner bag 14 in the region of the ventilation opening 22 lies on the covering 12.

Figure 2:
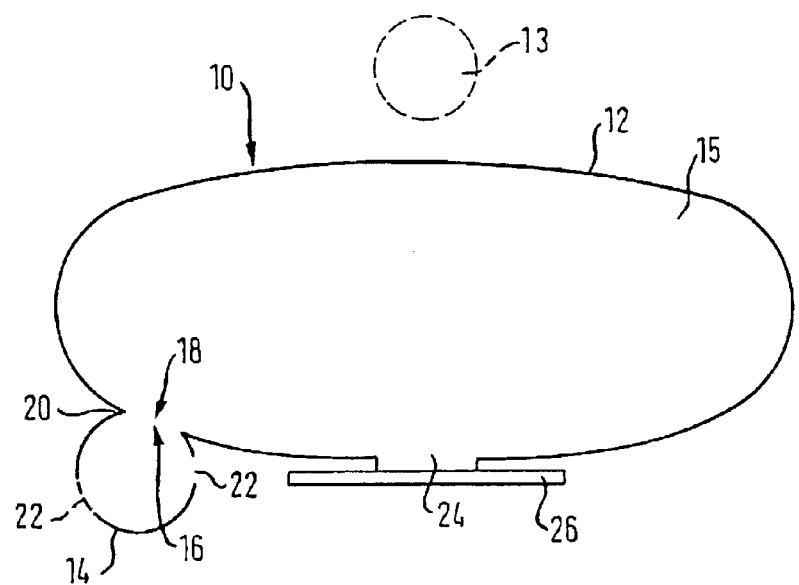
FIG. 2 shows a section through the gas bag of FIG. 1 in fully inflated state.

As shown in FIG. 2, the ventilation opening 22 is arranged so that it is directed towards the outer wall of the covering in the fully inflated state of the gas bag 10 when the inner bag has emerged from the covering 12.

The gas bag 10 is preferably arranged on a vehicle part 26 so that the inner bag 14 and especially the ventilation opening 22 face away from the occupant 13 who strikes onto the gas bag 10.

The inner bag 14 may also have several ventilation openings 22 (in dashed lines in FIG. 2).

What is claimed is:

1. A gas bag for a vehicle occupant restraint system, comprising:

an outer wall limiting an interior defining a main chamber of said gas bag, and having a passage opening, and an inner bag with an inflow opening and at least one ventilation opening, an edge of said inflow opening of said inner bag being connected with an edge of said passage opening, said gas bag and said inner gas bag being constricted at the edges of said inflow opening and said passage opening, and said inner bag being arranged within said interior defining said main chamber in a folded state of said gas bag and being able to emerge from said interior during an inflation of said gas bag through said passage opening, said ventilation opening facing an outer surface of said covering when said inner bag has emerged and is inflated.

2. The gas bag according to claim 1, wherein said ventilation opening is arranged so that no gas emerges through said ventilation opening before said emergence of said inner bag from said outer wall.

3. The gas bag according to claim 1, wherein in the fully inflated state of said gas bag, a volume of said inner bag, defining a first volume, is distinctly smaller than a second volume, defined by the volume of said main chamber of said main chamber.

4. The gas bag according to claim 1, wherein said covering and said inner bag are woven in one piece.

5. The gas bag according to claim 1, wherein, in an installed state in a vehicle, said inner bag is arranged on a side of said outer wall facing away from an occupant in an emerged state of said inner bag.

6. The gas bag according to claim 1, wherein several ventilation openings are provided.

7. A gas bag for a vehicle occupant restraint system comprising:

an outer wall limiting an interior defining a main chamber of said gas bag, and having a passage opening, and an inner bag made of a fabric and having an inflow opening and at least one ventilation opening, an edge of said inflow opening of said inner bag being connected with an edge of said passage opening, said gas bag and said inner gas bag being constricted at the edges of said inflow opening and said passage opening, and said inner bag being arranged within said interior defining said main chamber in a folded state of said gas bag and being able to emerge from said interior during an inflation of said gas bag through said passage opening.

* * * * *